(12) United States Patent
Nagaoka

(10) Patent No.: US 6,177,006 B1
(45) Date of Patent: *Jan. 23, 2001

(54) FILTERING DEVICE

(76) Inventor: Tadayoshi Nagaoka, 573-2, Oaza Ureshi, Tondabayashi-shi, Osaka-fu (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/050,618

(22) Filed: Mar. 30, 1998

(51) Int. Cl.[7] .............................. B01D 33/29; B01D 33/52
(52) U.S. Cl. ..................... 210/195.1; 210/258; 210/330; 210/385; 210/388; 210/391; 210/408
(58) Field of Search .................................. 210/195.1, 258, 210/327, 330, 335, 383, 388, 389, 385, 391, 407, 408, 416.1, 106, 107

(56) References Cited

U.S. PATENT DOCUMENTS

| | | |
|---|---|---|
| 616,033 * | 12/1898 | Sturcke . |
| 640,579 * | 1/1900 | Mayer . |
| 653,421 * | 7/1900 | Lorey . |
| 1,138,741 * | 5/1915 | Fowler . |
| 1,151,634 * | 8/1915 | Watters . |
| 2,514,159 * | 7/1950 | Jonsson . |
| 3,100,190 * | 8/1963 | Hobson, Jr. . |
| 3,262,568 * | 7/1966 | Zehrbach . |
| 3,481,474 * | 12/1969 | Paulson . |
| 3,750,885 | 8/1973 | Fournier . |
| 3,807,568 * | 4/1974 | Ruthrof . |
| 4,579,570 * | 4/1986 | Klaas . |
| 5,024,771 * | 6/1991 | Chiarito . |
| 5,322,546 * | 6/1994 | Holsgrove et al. . |

FOREIGN PATENT DOCUMENTS

| | | |
|---|---|---|
| 0719890 | 7/1996 | (EP) . |
| 2517558 | 6/1983 | (FR) . |
| 2127317 | 4/1984 | (GB) . |

OTHER PUBLICATIONS

European Search Report, The Hague, Jul. 8, 1999, Examiner Plaka, T.

* cited by examiner

*Primary Examiner*—David A. Simmons
*Assistant Examiner*—Fred Prince
(74) *Attorney, Agent, or Firm*—Hedman, Gibson & Costigan, P.C.

(57) ABSTRACT

A filtering device includes a container having an inlet for introducing liquid to be treated, a screen provided in the container having an outlet for delivering out treated liquid, and flow creating means for creating, in said container, a flow of the liquid to be treated having a direction which is different from direction of a flow of the liquid to be treated into the screen.

3 Claims, 11 Drawing Sheets

FILTERING DEVICE

BACKGROUND OF THE INVENTION

This invention relates to a filtering device and, more particularly, to a filtering device suitable for precision filtering in a state submerged in liquid to be treated. Liquid to be treated includes water for general uses, drinking water, river water, pool water and various other liquids.

Known in the art of filtering devices is one which employs a plurality of filter tubes. In this filtering device, a plurality of fiter tubes are provided in parallel in a container. Liquid to be treated is introduced from an inlet provided in one end portion of the container via a pump and filtered through these filter tubes and treated liquid is delivered out of a treated liquid outlet provided in the other end of the container.

For the filter tubes used in the prior art filtering device, filter elements for precision filtering which consist of a porous material or a filtering cloth having densely formed pores are used. In these filter elements, however, pores of these filter elements are blocked by fine powdery materials suspending in the liquid to be treated in a relatively short period of time after starting of operation of the filtering device with the result that filtering efficiency is rapidly dropped. For this reason, the filtering operation of the filtering device has to be stopped for performing reverse washing of the surface of the filter elements and resumed after removing the materials which have blocked the pores of the filter elements. Such stopping of the filtering operation and performing of reverse washing need to be repeated frequently during the filtering operation with resulting decrease in the working efficiency. Besides, the blocking of the inside of pores of the filter elements advances notwithstanding the repetition of reverse washing until at last it becomes necessary to take out all of the filter elements from the filter tubes and replace them by new filter elements.

It is, therefore, an object of the present invention to provide a novel high precision filtering device having a high filtering efficiency which is capable of preventing blocking of filter elements while continuing the filtering operation without stopping the filtering operation for performing reverse washing.

SUMMARY OF THE INVENTION

For achieving the above described object of the invention, there is provided a filtering device comprising a container having an inlet for introducing liquid to be treated, a screen provided in the container having an outlet for delivering out treated liquid, and flow creating means for creating, in said container, a flow of the liquid to be treated having a direction which is different from direction of a flow of the liquid to be treated into the screen.

According to the invention, a flow of the liquid to be treated having a direction which is different from direction of a flow of the liquid to be treated into the screen is created and powdery suspending solid particles in liquid to be treated which tend to be deposited on the surface of the screen are washed away from the surface of the screen by this flow having the different direction from the flow into the screen, so that these suspending solids are kept away from the surface of the screen whereby blocking of the screen can be prevented. The filtering device according to the invention therefore can prevent blocking of filter elements while continuing the filtering operation without stopping the filtering operation.

Since this filtering device does not require a bulky device for reverse washing or scraper as in the prior art filtering device, the filtering device can be constructed in a relatively compact design and at a reduced cost.

In one aspect of the invention, said flow creating means is means for reciprocating the screen vertically in the liquid to be treated.

In another aspect of the invention, said flow creating means is means for rotating the screen horizontally in the liquid to be treated.

In another aspect of the invention, said flow creating means is means for reciprocating the screen horizontally.

In another aspect of the invention, said flow creating means is a combination of at least two of means for reciprocating the screen vertically, means for rotating the screen horizontally and means for reciprocating the screen horizontally.

In another aspect of the invention, said flow creating means is means for creating a vortex in the liquid to be treated.

For creating a vortex, the flow creating means may be the inlet of the container which is arranged horizontally obliquely with respect to a line normal to the circumference of the container.

For creating a vortex, said flow creating means may be a stirrer provided in the container.

In another aspect of the invention, the filtering device comprises at least two of said containers and connecting pipes connecting said two containers together in communication to each other and wherein said flow creating means is a turbine or a pump provided in one of said connecting pipes.

These and other features and advantages of the invention will become apparent from the description made below in conjunction with the accompanying drawings.

BRIEF DESCRIPTION OF THE DRAWINGS

In the accompanying drawings.

DESCRIPTION OF PREFERRED EMBODIMENTS

Referring to the accompanying drawings, a preferred embodiment of the invention will now be described.

Figure 1:
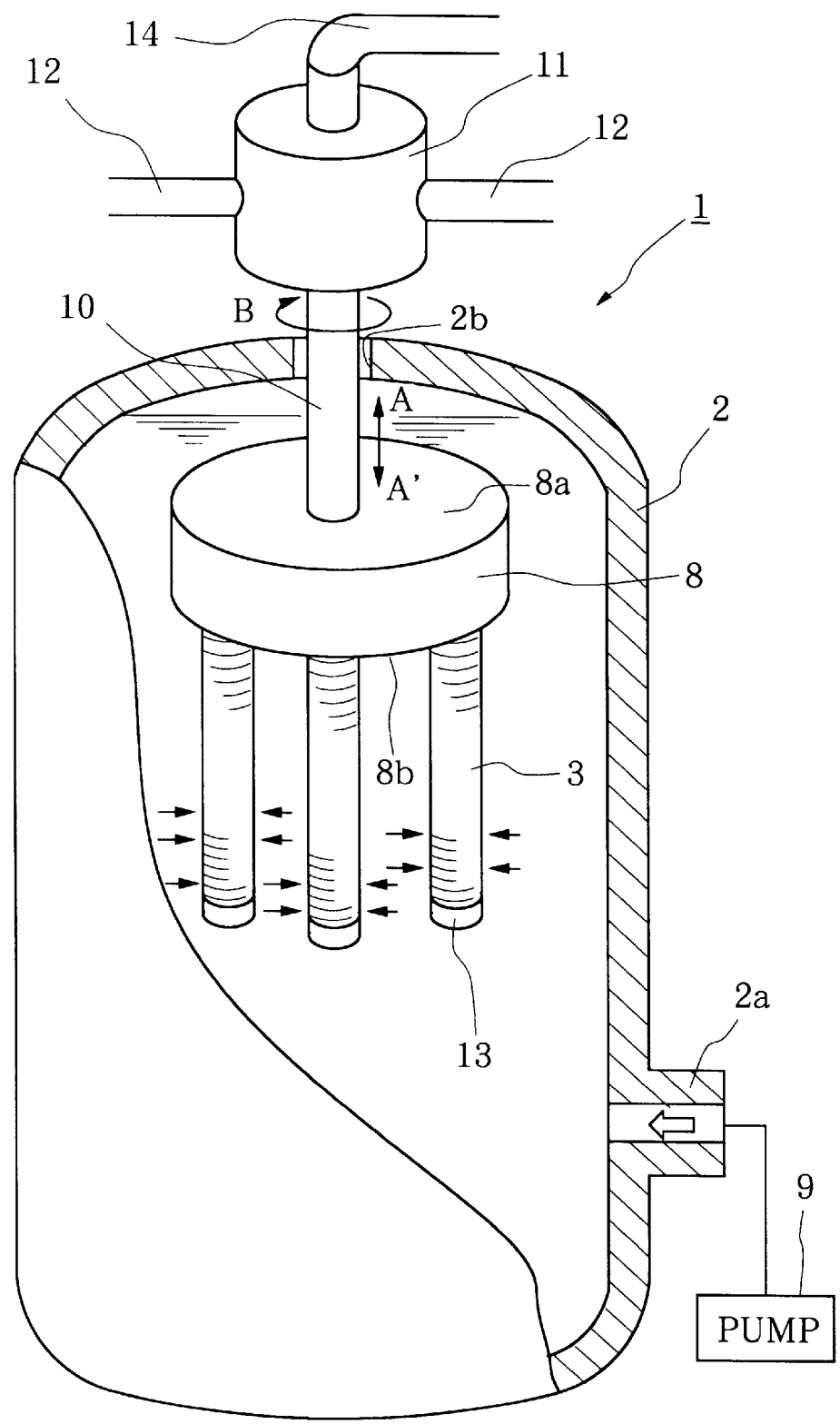
FIG. 1 is a perspective view, partly in section, of an embodiment of the filtering device made according to the invention.
Figure 2:
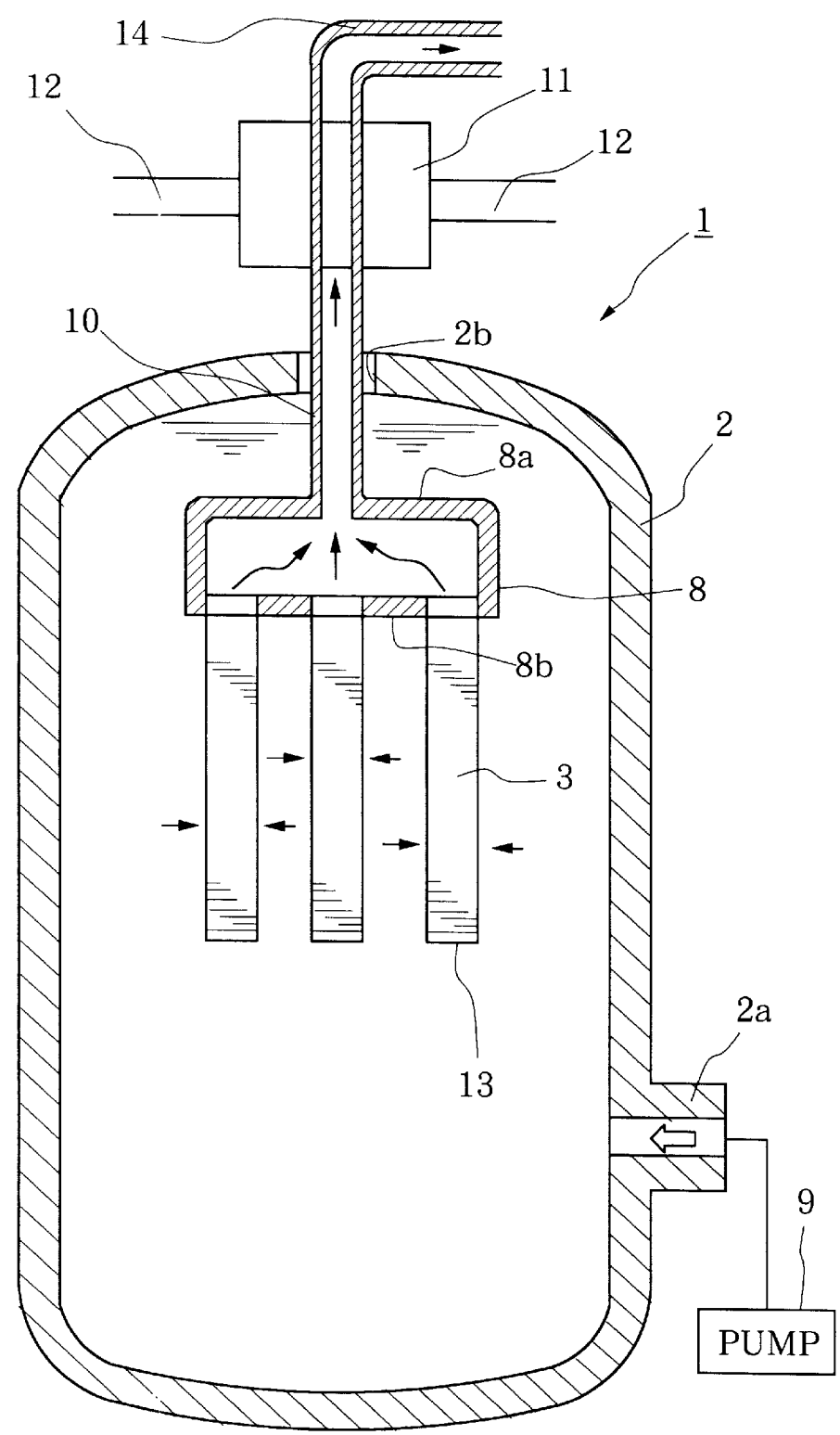
FIG. 2 is a sectional view of the embodiment shown in FIG. 1.
Figure 3:
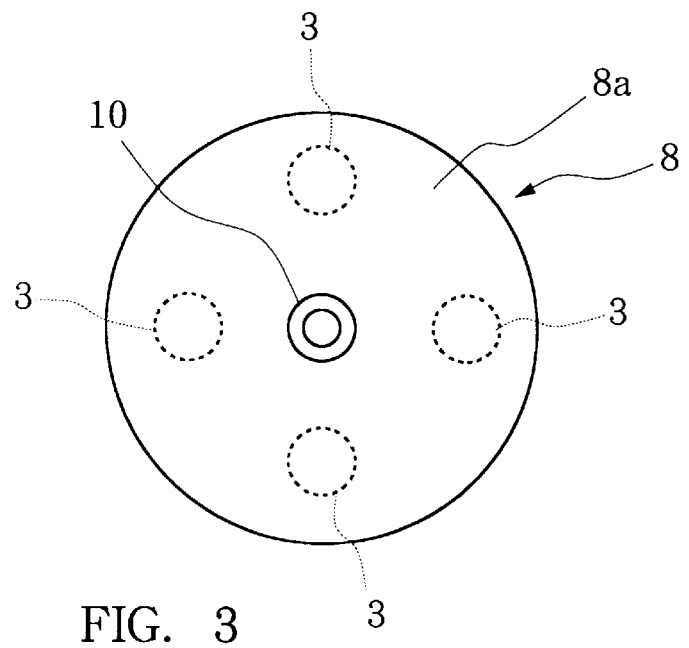
FIG. 3 is a top plan view of a screen holder.

FIGS. 1 to 3 illustrate an embodiment of the invention. A filtering device 1 has a container 2 having a circular cross section. An inlet 2a for introducing liquid to be treated is formed in the lower portion of the container 2. A pump 9 is connected to the filtering device 1. The liquid to be treated is filled nearly to the upper end wall of the container 2. A screen holder 8 of a short cylindrical configuration closed in its upper and lower end portions by a top plate 8a and a bottom plate 8b is suspended in the liquid to be treated in the container 2 by means of a hollow drive shaft 10 which extends vertically through an opening 2b formed in the top wall of the container 2 and is fixedly secured at its lower end portion to the top plate 8a of the screen holder 8 and connected at its upper end portion to a drive unit 11 which in turn is fixed to an upper frame 12 of the filtering device 2.

A plurality (four in the present embodiment) of cylindrical wedge wire screens 3 are secured fixedly to the bottom plate 8b of the screen holder 8 and extend vertically downwardly in a state submerged in the liquid to be treated.

Figure 4:
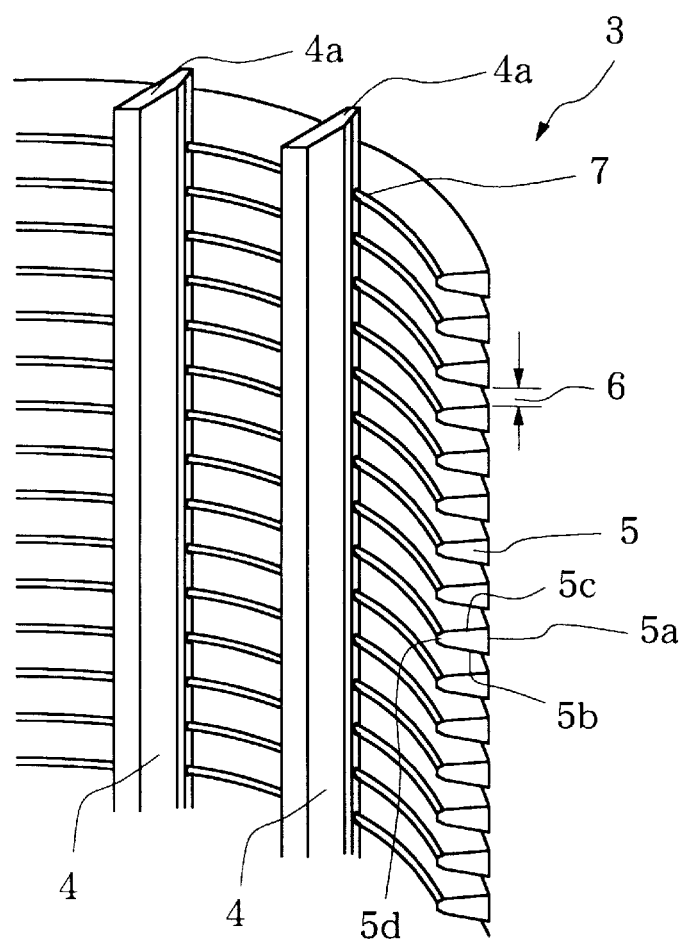
FIG. 4 is a partial enlarged perspective view of a screen shown in the embodiment of FIG. 1.

In the present embodiment, the screen 3 has, as will be apparent from FIG. 4, support rods 4 extending in the axial direction of the screen 3 and arranged generally cylindrically with a predetermined interval and having a projecting portion 4a in a radially outward end portion and a wedge wire 5 wound spirally on the outside of the support rods 4 in substantially crossing direction to the support rods 4. The wedge wire 5 is arranged with its one side 5a facing outside and two other sides 5b and 5c forming a slit 6 which widens radially inwardly between adjacent wedge wire portions and with an inward apex 5d of the wedge wire 5 being welded to the projecting portion 4a of the support rods 4 at crossing points 7 of the wedge wire 5 and the support rods 4. The lower end of the screen 3 is closed by a seal plates 13 (FIG. 1). The wedge wire 5 constitutes a cylindrical filter member.

The open upper end portion of the screen 3 communicates with the inside space of the hollow screen holder 8 and the hollow drive shaft 10 also communicates with the inside space of the screen holder 8. The drive shaft extends through the drive unit 11 and a flexible hose 14 which constitutes an outlet of treated liquid is connected to the upper end portion of the drive shaft 10.

The drive unit 11 includes an electric motor (not shown) and a known drive mechanism such as a slider crank mechanism which transfers a reciprocating sliding motion to the drive shaft 10 to thereby reciprocate the drive shaft 10 in the vertical direction. Since such drive mechanism is well known, illustration and detailed description thereof will be omitted.

The operation of this filtering device 1 will now be described.

During the filtering operation, the pump 9 is operated to introduce liquid to be treated from the inlet 2a into each each screen 3. The liquid to be treated flows into the screen 3 and the filtered liquid flows upwardly inside of the screen 3 and flows out of the hose 14 through the inside space of the screen holder 8 and the hollow drive shaft 10.

During the filtering operation, the drive unit 11 is operated continuoulsy or intermittenly to move the drive shaft 10 in a vertical reciprocating motion as shown by arrows A in FIG. 1. By this operation, the screens 3 which are fixed to the screen holder 8 are also moved in a vertical reciprocating motion and, as a result, there is created a flow of liquid to be treated having a direction of flow which is different from the direction of flow of the liquid to be treated flowing into the screen. That is, a vertical reciprocating flow of liquid is created relative to the surface of the screens 3 in addition to the horizontal flow of liquid flowing into the screens 3.

Figure 5A:
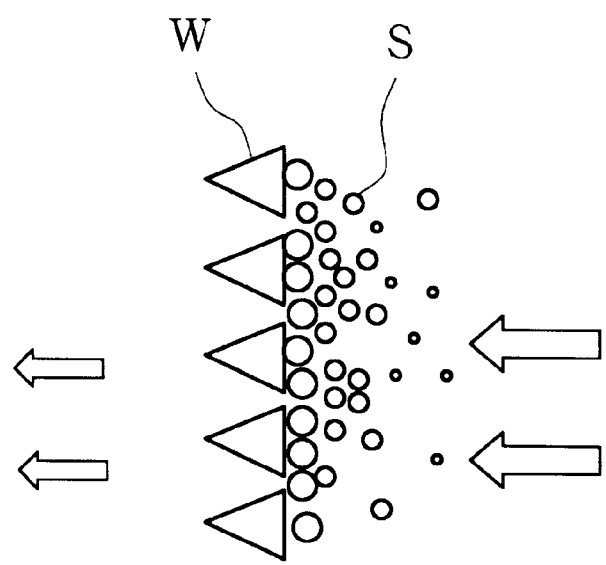
FIG. 5A and 5B are views explanatory of a state of deposition of suspended solid particles in liquid to be treated to the surface of the screen.
Figure 5B:
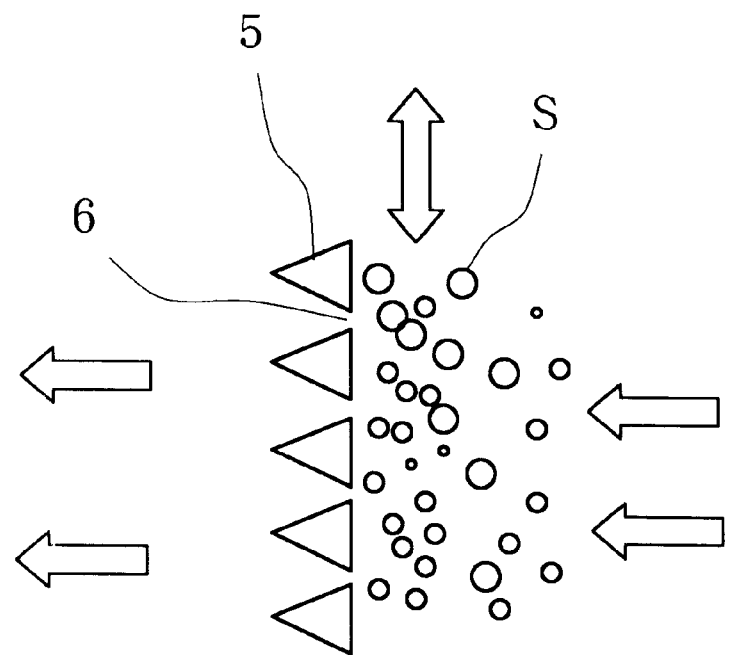

In the prior art filtering device, as liquid to be treated flows into the slit 6 of the wedge wire 5, powdery solids S are deposited on the surface of a wedge wire W as shown in FIG. 5A. According to the filtering device 1 of the present invention, as shown in FIG. 5B, powdery solids S which tend to be deposited on the surface of the wedge wire 5 are washed away from the surface of wedge wire 5 by the vertical flow of liquid caused by the vertical reciprocating motion of the screens 3 and are kept away from the surface of the wedge wire 5. As a result, blocking of the slit 6 of the wedge wire 5 by the powdery solids S can be prevented.

In another embodiment of the invention, the drive unit 11 includes an electric motor (not shown) and the drive shaft 10 is connected to the driving shaft of the electric motor through a reduction gear in such a manner that rotation of the electric motor is transferred to the drive shaft 10. In this embodiment, the drive shaft 10 is rotated about its axis as shown by arrow B in FIG. 1 by driving of the electric motor in the drive unit 11 and, therefore, the screen holder 8 is also rotated with the drive shaft 10. This creates a vortex flow in the liquid to be treated in the container 2 and this vortex flow constitutes a flow of liquid having a direction which is different from direction of the flow into the screens 3. As a result, the solid particles which tend to be deposited on the surface of the screens 3 are washed away by this vortex flow and the same advantage as that in the embodiment of FIG. 1 can be obtained.

In the embodiment shown, the drive shaft 10 is rotated in a clockwise direction but, alternatively, the drive shaft 10 may be rotated in a counterclockwise direction or in both clockwise and counterclockwise directions alternately.

Figure 6:
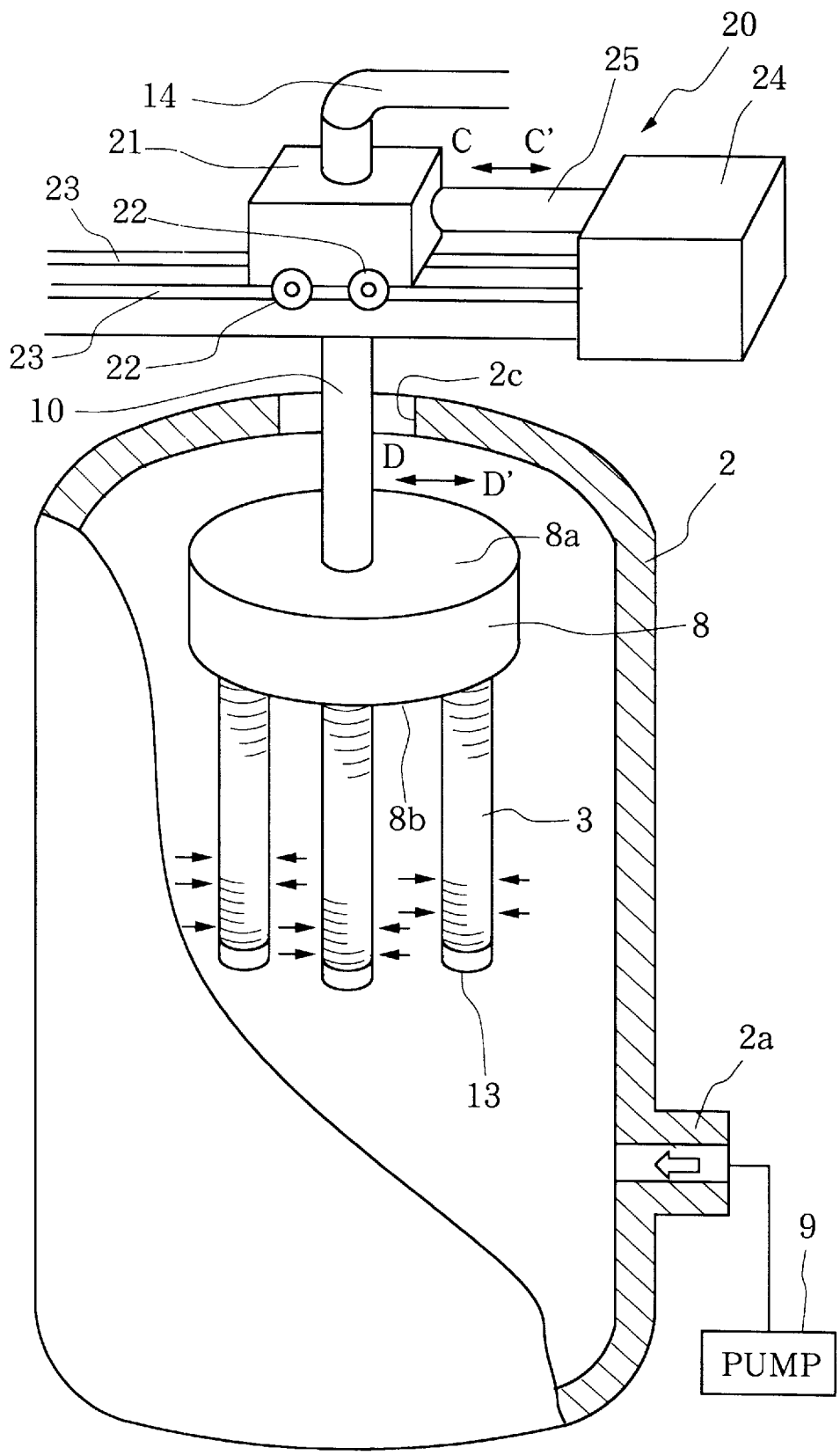
FIG. 6 is a perspective view, partly in section, of another embodiment of the invention.
Figure 7:
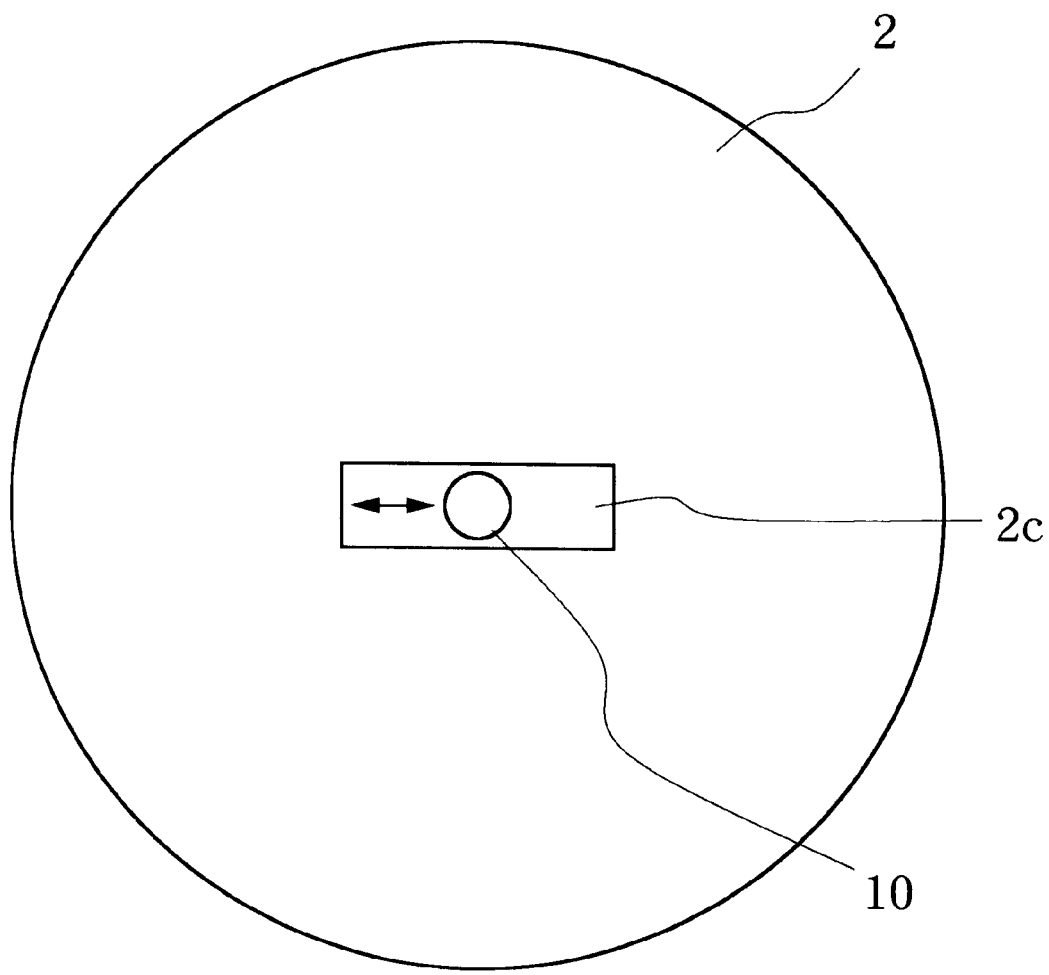
FIG. 7 is a top plan view of the container of the embodiment shown in FIG. 6.

FIGS. 6 and 7 show another embodiment of the invention. In this and subsequent embodiments, the same component parts as those used in the embodiment of FIG. 1 are designated by the same reference characters as those used for the embodiment of FIG. 1 and description thereof will be omitted.

In the embodiment of FIG. 6, the container 2 is formed in its top wall portion with a horizontally extending slot 2c and the drive shaft 10 is received loosely in this slot 2c. The upper end portion of the drive shaft 10 is inserted through and fixed to a slider 21 of a drive unit 20. The drive unit 20 includes a drive mechanism 24 including an electric motor and a known drive mechanism such as a slider crank mechanism which transfers a reciprocating motion to the slider 21 through a connecting rod 25. The slider 21 has rollers 22 which are engaged with a pair of horizontal rails 23. By operating the drive unit 20, the slider 21 is reciprocated in the direction of arrows C, C'. This causes the drive shaft 10 to reciprocate in the direction of arrows D, D' in the slot 2c of the container 2 whereby the screens 3 reciprocate in the direction of the arrows D, D' in the liquid to be treated. This creates a flow (horizontal flow) having a direction of flow which is different from direction of the flow into the screens 3 whereby suspending solids are washed away from the surface of the screens 3.

As the flow creating means, the drive units of the embodiments of FIG. 1 and FIG. 6 may be combined together so that at least two of the vertical reciprocating motion, horizontal rotating motion and horizontal reciprocating motion will be imparted to the screens 3.

Figure 8:
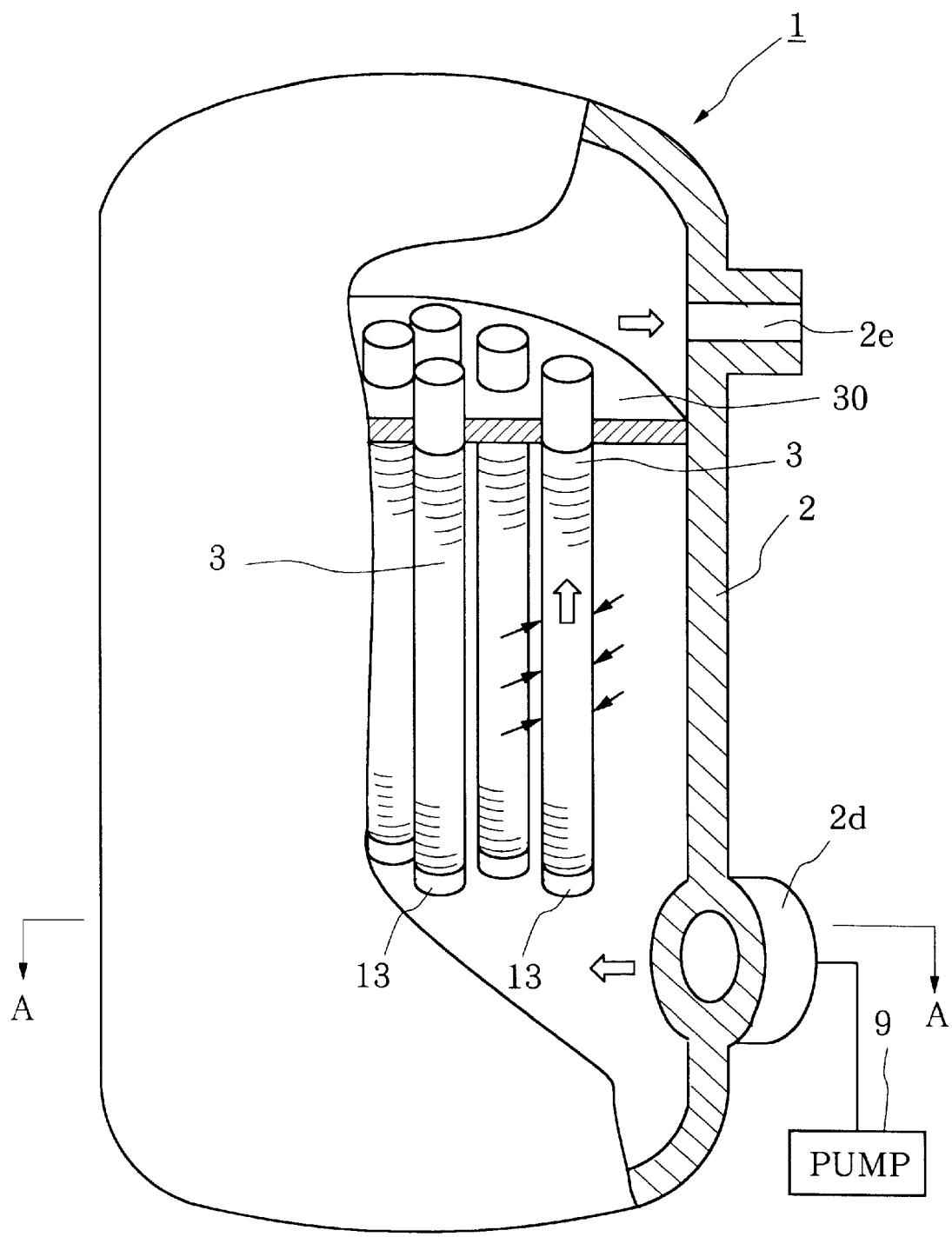
FIG. 8 is a perspective view, partly in section, of another embodiment of the invention.
Figure 9:
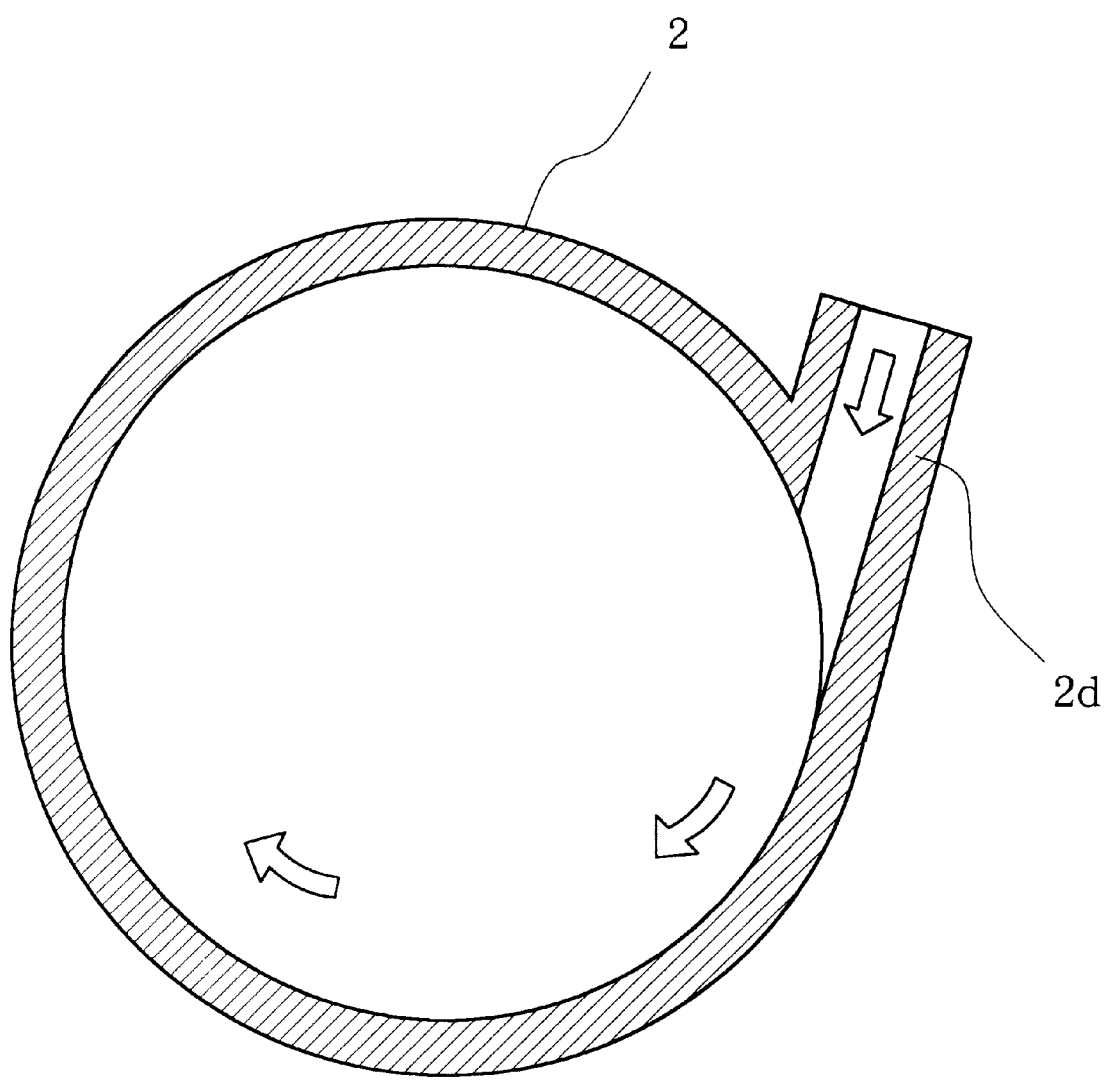
FIG. 9 is a view taken along lines A—A in FIG. 8.

FIGS. 8 and 9 show another embodiment of the invention.

In this embodiment, a horizontally disposed disk-like seal plate 30 is fixed to the inner wall of the upper portion of the container 2.

To this seal plate 30 are fixed a plurality of cylindrical screens 3 which extend in the vertical direction penetrating through and fixed to the seal plate 30. An inlet 2d for introducing liquid to be treated is formed in the lower portion of the container 2 and an outlet 2e for delivering out treated liquid is formed in the upper portion of the container 2 above the seal plate 30.

In this embodiment, the inlet 2d of the container 2 is arranged horizontally obliquely with respect to a line normal to th ecircumference of the container 2.

According to this embodiment, a vortex flow is created by the liquid to be treated which flows into the container 2 through the obliquely disposed inlet 2d and this vortex flow has a direction of flow different from the direction of the flow into the screens 3 whereby suspending solids are washed away from the surface of the screens 3.

Figure 10:
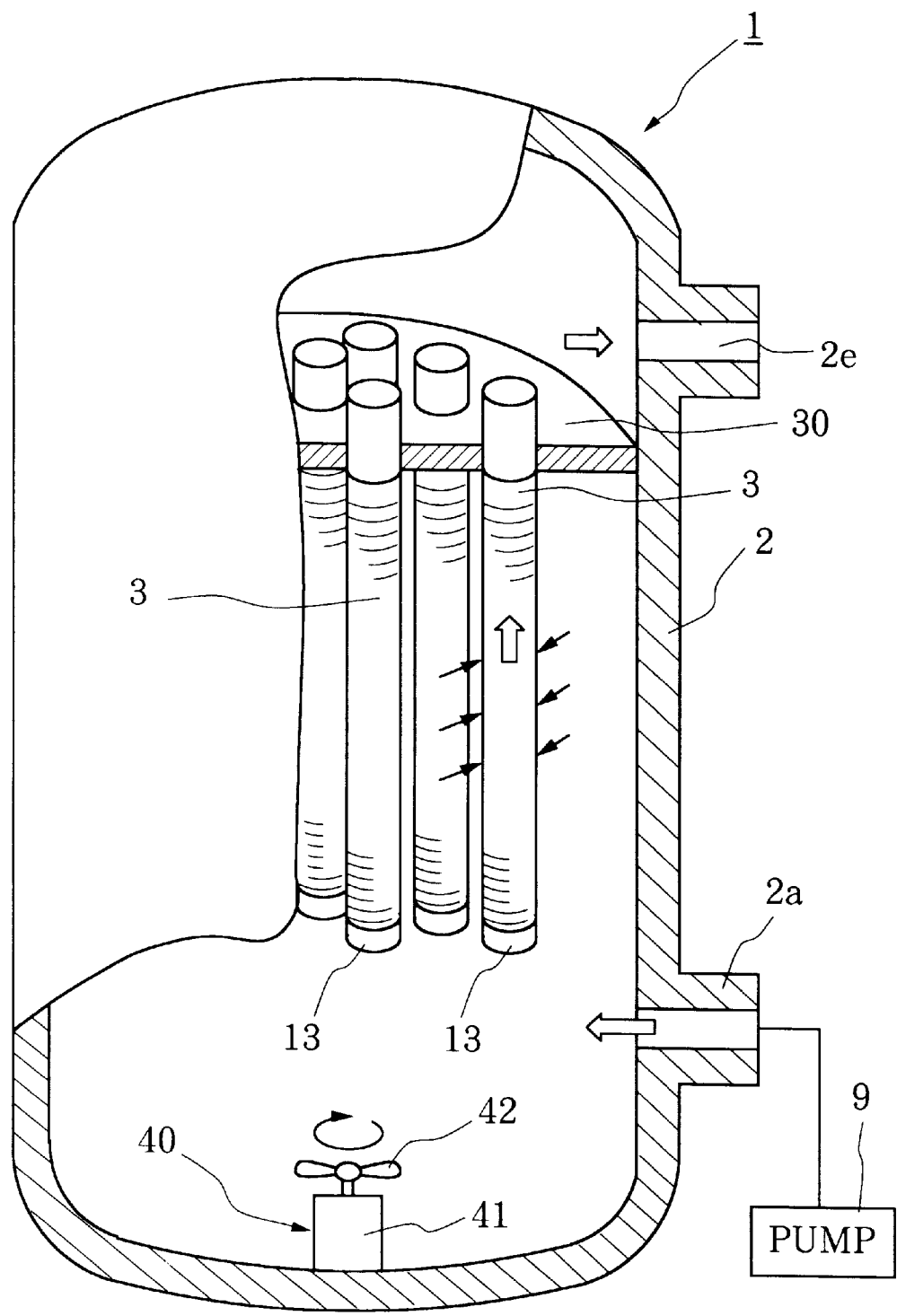
FIG. 10 is a perspective view, partly in section, of another embodiment of the invention.

FIG. 10 shows another embodiment which is similar to the embodiment of FIG. 8 but is different in the means for creating a vortex flow. The same component parts are designated by the same reference characters through the embodiments of FIGS. 8 and 10 and description thereof will be omitted.

In the embodiment of FIG. 10, the inlet 2a is arranged in the same way as the embodiments of FIGS. 1 and 6 and the means for creating a vortex flow is a stirrer 40 provided on the inner bottom surface of the container 2. The stirrer 40 includes a motor 41 and a propeller 42 driven by the motor 41. By rotation of the propeller 42, a vortex flow is created which has a direction of flow which is different from the direction of the flow into the screens 3.

Figure 11:
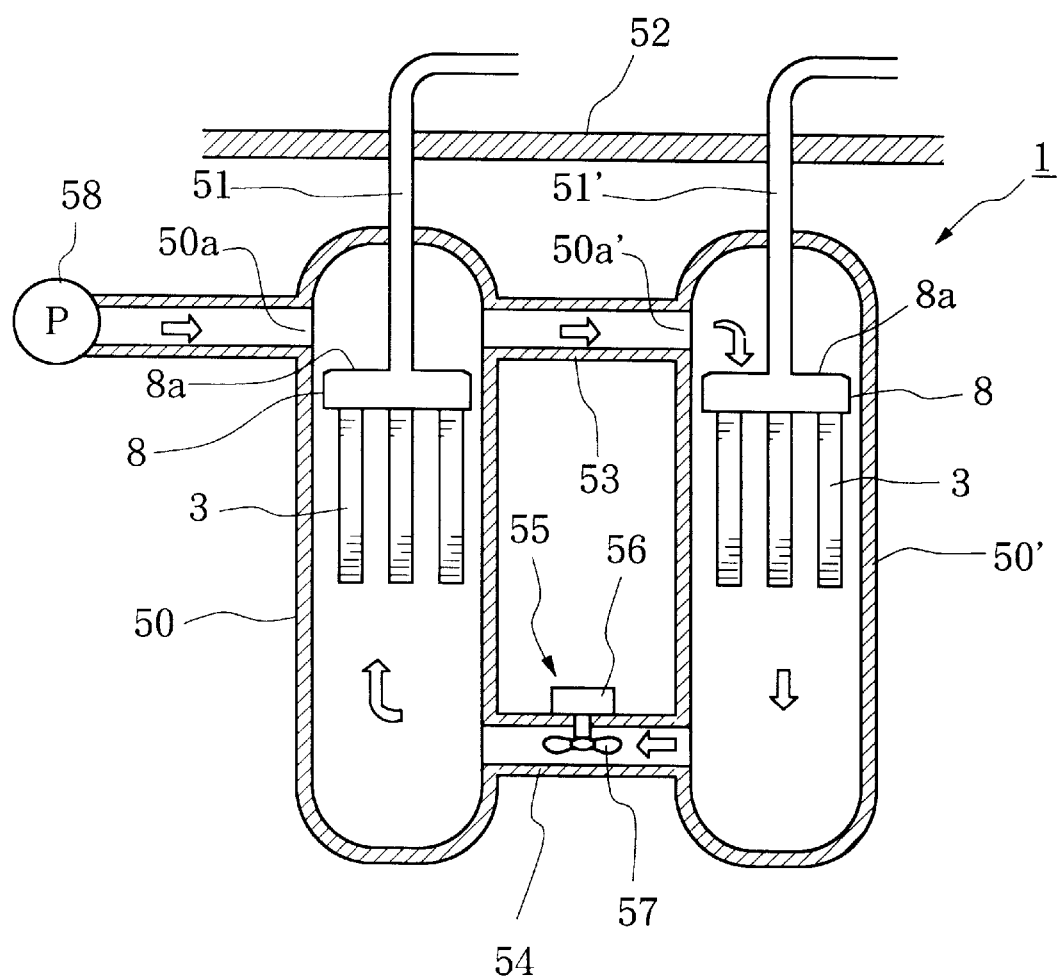
FIG. 11 is a sectional view of another embodiment of the invention.

FIG. 11 shows another embodiment of the invention. This embodiment includes two containers 50 and 50'. These containers 50 and 50' are connected together in communication to each other in the upper and lower portions thereof by two horizontally extending connecting pipes 53 and 54. Vertically extending outlet pipes 51 and 51' are connected to the top plates 8a of the screen holders 8 and are communicated with the inside of the screen holders 8. The outlet pipes 51 and 51' are fixed to a frame 52 of the filtering device 1. In the connecting pipe 54 is provided a turbine 55 which includes a motor 56 and a propeller 54.

Liquid to be treated is introduced from a pump 58 to the container 50 through an inlet 50a. As the turbine 55 is operated, the liquid to be treated makes a circulation through a route via the inlet 50a, connecting pipe 53, container 50', connecting pipe 54 and the container 50. This creates a flow (vertical flow) having a direction of flow which is different from the direction of the flow into the screens 3 whereby suspending solids are washed away from the surface of the screens 3.

Figure 12:
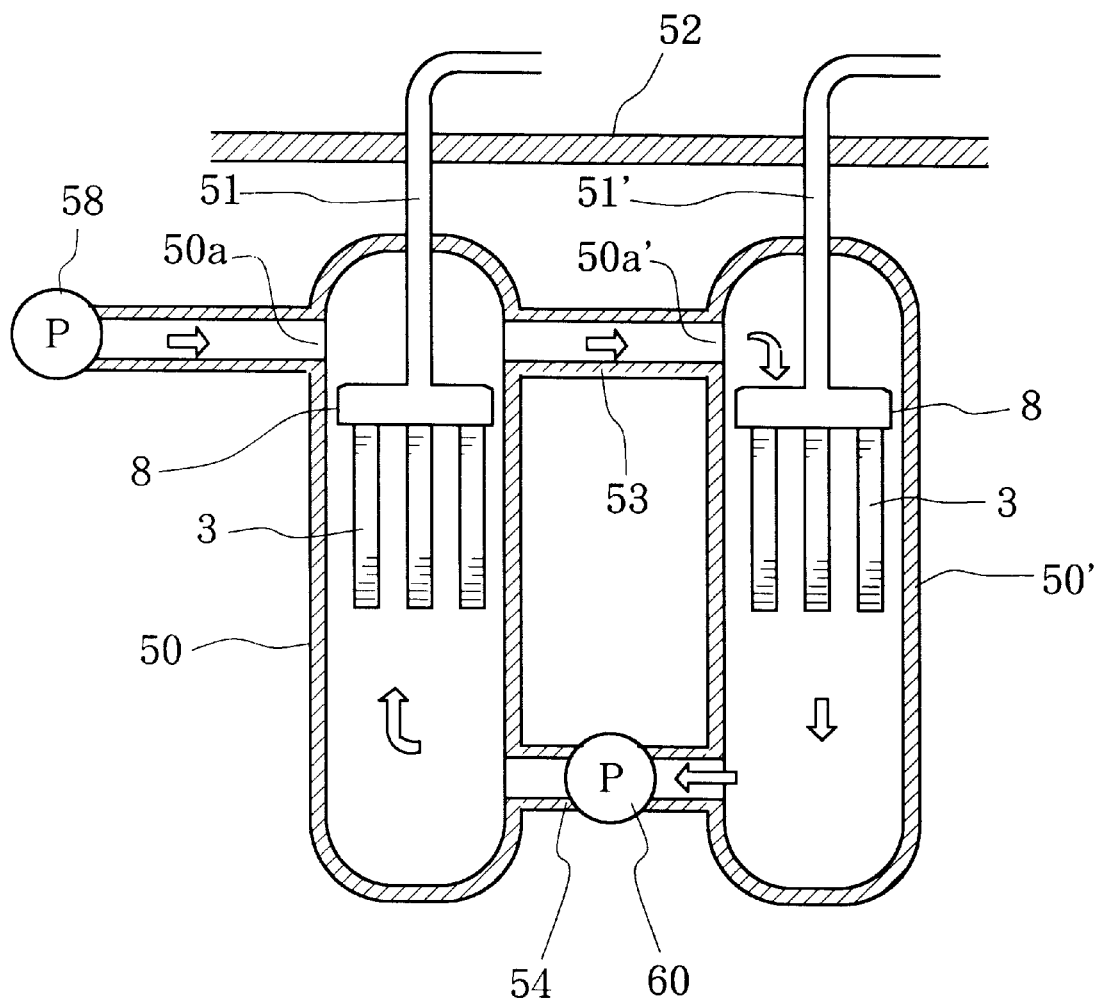
FIG. 12 is a sectional view of another embodiment of the invention.

An embodiment shown in FIG. 12 is of a similar structure to the embodiment shown in FIG. 11 and the same component parts are designated by the same reference characters through these two embodiments and description thereof will be omitted.

In the embodiment of FIG. 12, the flow creating means is a pump 60 provided in the connecting pipe 54. By the actuation of the pump 60, there is created a flow having a direction of flow which is different from the direction of the flow into the screens 3 whereby suspending solids are washed away from the surface of the screens 3.

In the embodiments of FIGS. 11 and 12, two containers are connected together but three or more containers may be connected to each other.

In the above described embodiments, the wedge wire screen is used. The invention is applicable not only to the filtering device using the wedge wire screen but other types of screens such as one using a wire-mesh screen, one using a filter cloth, one using a punched metal plate screen and one using a hollow fiber membrane filter.

What is claimed:

1. A filtering device comprising:
   a container having an inlet for introducing liquid to be treated;
   a screen provided in the container, having an outlet for delivering out treated liquid; and
   flow creating means for creating, in said container and outside of the screen, a flow of the liquid to be treated having a direction which is different from direction of a flow of the liquid to be treated flowing from the outside of the screen into the screen, during a filtering operation said flow creating means being a combination of means for reciprocating the screen vertically in the liquid to be treated and means for rotating the screen horizontally in the liquid to be treated.

2. A filtering device comprising:
   two containers each having an inlet for introducing liquid to be treated;
   two connecting pipes connecting said two containers to each other in communication to each other, one of said pipes allowing the liquid to be treated to flow from one of said containers to the other and the other of said pipes allowing the liquid to be treated to flow from the other container to the one container;
   a screen provided in each of said containers, having an outlet for delivering out treated liquid, and
   flow creating means for creating in said container and outside of the screen, a flow of the liquid to be treated having a direction which is different from the direction of a flow of the liquid to be treated flowing from the outside of the screen into the screen, said flow creating means being a turbine provided in one of said connecting pipes to cause circulation of the liquid to be treated between the containers.

3. A filtering device comprising:
   two containers each having an inlet for introducing liquid to be treated;
   two connecting pipes connecting said two containers to each other in communication to each other, one of said pipes allowing the liquid to be treated to flow from one of said containers to the other and the other of said pipes allowing the liquid to be treated to flow from the other container to the one container;
   a screen provided in each of said containers, having an outlet for delivering out treated liquid, and
   flow creating means for creating, in said container and outside of the screen, a flow of the liquid to be treated having a direction which is different from the direction of a flow of the liquid to be treated flowing from the outside of the screen into the screen, said flow creating means being a pump provided in one of said connecting pipes to cause circulation of the liquid to be treated between the containers,
   a screen provided in the container, having an outlet for delivering out treated liquid; and
   flow creating means for creating, in said container and outside of the screen, a flow of the liquid to be treated having a direction which is different from direction of a flow of the liquid to be treated flowing from the outside of the screen into the screen, said flow creating means being means for reciprocating the screen vertically in the liquid to be treated.

* * * * *